United States Patent

Toritani et al.

(10) Patent No.: US 6,635,707 B1
(45) Date of Patent: Oct. 21, 2003

(54) PROCESS FOR PRODUCING SYNTHETIC LATEX

(75) Inventors: Akihiro Toritani, Otake (JP); Masaki Sugihara, Otake (JP); Hideaki Makino, Otake (JP); Kouji Matsumura, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/720,254

(22) PCT Filed: Jul. 9, 1999

(86) PCT No.: PCT/JP99/03712

§ 371 (c)(1),
(2), (4) Date: Feb. 27, 2001

(87) PCT Pub. No.: WO00/02927

PCT Pub. Date: Jan. 20, 2000

(30) Foreign Application Priority Data

Jul. 9, 1998 (JP) ............................................. 10-194646

(51) Int. Cl.$^7$ ................................................. C08C 1/00
(52) U.S. Cl. ........................ 524/700; 526/80; 524/706; 524/750; 524/773
(58) Field of Search .................... 526/79, 80; 524/700, 524/706, 750, 773

(56) References Cited

U.S. PATENT DOCUMENTS 4,480,078 A    10/1984  Gujarathi
5,521,252 A    5/1996   Matsuda et al.
5,847,050 A *  12/1998  Toritani et al. ............... 525/84

FOREIGN PATENT DOCUMENTS

| AU | 441 588      | 10/1973 |
| EP | 0 075 529    | 3/1983  |
| EP | 0 761 693 A2 | 3/1997  |
| JP | 54-003511    | 2/1979  |
| JP | 56-016502    | 2/1981  |
| JP | 58-069204    | 4/1983  |
| JP | 11-246606    | 9/1999  |

* cited by examiner

Primary Examiner—David W. Wu
Assistant Examiner—William Cheung
(74) Attorney, Agent, or Firm—Oblon, Spivak, McClelland, Maier & Neustadt, P.C.

(57) ABSTRACT

A synthetic latex is prepared by charging a portion of water and a monomer as raw materials in a reactor in a ratio of monomer/water, at which a maximum ultimate pressure in said reactor that is attained if an initial composition in said reactor before the initiation of the polymerization is polymerized from a polymerization initiation temperature in an insulated state, is within a practical proof pressure of said reactor; initiating the polymerization; adding dropwise the remainder of said water and said monomer during the polymerization, continuously or intermittently, and performing the emulsion polymerization. As a result, the emulsion polymerization can be stably performed while controlling the temperature and pressure in said reactor in a runaway reaction in all processes of the method of preparing the synthetic latex, thus making it possible to improve the productivity.

20 Claims, 6 Drawing Sheets

PROCESS FOR PRODUCING SYNTHETIC LATEX

TECHNICAL FIELD

The present invention relates to a method of preparing a synthetic latex suited for a method of preparing an industrially useful diene rubber polymer latex etc., which has improved productivity.

BACKGROUND ART

Diene rubber polymers are widely known as elastic materials used in ABS and MBS resins and are usually prepared by emulsion polymerization via an aqueous dispersion of a polymer, i.e. synthetic latex. Regarding these diene rubber polymers, a further improvement in productivity is required because of their high utility.

The reaction pressure during the polymerization often reaches high pressures above 0.098 MpaG in the preparation of synthetic latexes represented by diene rubber polymer latex, regardless of the preparation method. Therefore, there arises the problem of controlling the temperature and pressure in the reactor when runaway reactions generate.

Japanese Examined Patent Application, Second Publication No. Sho 54-3511 discloses an improved batchwise preparation method for the purpose of improving control of the polymerization temperature of a batchwise preparation method.

All of the monomer as a raw material is charged in advance in the reactor in case of the batchwise preparation method, whereas the improved batchwise preparation method is a method of allowing the polymerization to proceed while adding dropwise a portion or all of the monomer raw material during the polymerization. In the improved batchwise preparation method, a state in which there is no monomer in the reactor can be attained by stopping the dropwise addition of the monomer, even if it becomes impossible to control the polymerization temperature during the dropwise addition of the monomer. As a result, the reaction rate is reduced to control the polymerization temperature, thereby making it possible to prevent runaway reactions.

According to the method described in Japanese Examined Patent Application, Second Publication No. Sho 54-3511, the polymerization is performed while adding dropwise the total amount of a liquid containing water as a principal component and a monomer as a raw material in a reactor fixed to a high activity under high temperature conditions, continuously or intermittently. In this case, since the total amount of the monomer is added dropwise, excess monomer is not retained in the polymerization system at any time. Therefore, it is easy to control the temperature and pressure in the reactor from the initial stage to the completion of the polymerization.

The present inventors have studied ways to improve the productivity of a diene rubber polymer and suggested a method of preparing a synthetic latex utilizing an improved batchwise preparation method in Japanese Patent Application No. Hei 10-053672.

The technique described in Japanese Patent Application No. Hei 10-053672 is directed to a method of charging a portion of a raw material, polymerizing the charged monomer, thereby to consume the monomer, and allowing the polymerization to proceed while adding dropwise the remainder of the monomer. More specifically, the technique utilizes the sensible heat of water by adding dropwise the monomer and water by half or more of the total amount during the emulsion polymerization, thereby remarkably improving the productivity.

However, according to the technique described in Japanese Unexamined Patent Application, Second Publication No. Sho 54-3511, when a condenser is provided for the purpose of removing heat generated during the polymerization, the heat removal efficiency of the condenser at the initial stage of the polymerization is lowered if some monomer is not present in the reactor before the polymerization.

If the particle diameter of the latex is controlled by using an emulsifier which has already been charged before the polymerization, the particle diameter varies sometimes when the total amount of the monomer is added dropwise. Therefore, an improvement is required.

To reduce scatter in the particle diameter of the latex in the improved batchwise preparation method, it is necessary to charge an emulsifier in the amount according to the desired particle diameter and a monomer in the amount required for the formation of particles. Therefore, the concentration of the emulsifier to be charged generally becomes larger than that in case of the batchwise preparation method by the volume of water to be added dropwise.

With the increase of the concentration of the emulsifier, the polymerization rate becomes higher and the polymerization heating value per unit volume becomes drastically larger. Therefore, the temperature also increases drastically during the runaway reaction, which sometimes makes it difficult to control the temperature.

In the method described in Japanese Patent Application No. Hei 10-053672, since a large amount of the monomer is present in the polymerization system until the charged monomer is consumed, there is a possibility of the occurrence of a runaway reaction. When a large amount of the monomer is present in the reactor, the pressure in the reactor increases with the increase of the polymerization temperature. According to the present inventors' study, for a diene monomer, the pressure in the reactor increases with the increase of the inner temperature until the conversion ratio based on the charged monomer becomes about 60%. Therefore, a method of controlling runaway reactions during while the pressure increases is separately required.

However, when the amount of water to be charged before the polymerization is reduced to the limit in expectation of an improvement in productivity due to the sensible heat of water, the temperature at the initial stage of the polymerization drastically increases as compared with a conventional batchwise preparation method, which sometimes makes it difficult to control the temperature.

To control the temperature and pressure in the reactor until the charged monomer is consumed, there can be suggested a method of pressurizing a large amount of a polymerization inhibitor using an inert gas such as nitrogen etc. under a pressure, which is sufficiently below the practical proof pressure of the reactor, and injecting it into the reactor.

The practical proof pressure refers to a value which is set so that a pressure change during ordinary operation can be absorbed, in contrast to the proof pressure of the reactor set by the manufacturer, and it varies depending on the kind of the reactor. Usually, there is set an upper limit of the pressure in the reactor, at which a safety valve or a bursting plate provided on the reactor does not operate during ordinary operation.

However, when the above method does not work effectively for some reason and the pressure exceeds the practical proof pressure, the safety valve or bursting plate operates as a final safety device. However, since a large amount of the monomer in the rector is discharged out of the system when the safety valve or bursting plate operates, such a situation should be avoided as much as possible.

As described above, it is generally difficult for the improved batchwise preparation method to control the temperature and pressure at the initial stage of the polymerization reaction, so that control of a runaway reaction is indispensable not only in laboratory-scale preparation but also in the factory scale preparation, and the conventional method has been insufficient.

This problem is not limited to the case of the diene rubber polymer and is common to the method of preparing a synthetic latex due to the emulsion polymerization wherein the reaction pressure during the polymerization reaches a high pressure, higher than 0.098 MpaG.

The present invention has been made in light of the circumstances described above and an object thereof is to improve the productivity by controlling an increase in temperature and pressure in a reactor due to the runaway reaction in all processes in the emulsion polymerization of a synthetic latex. An object of the present invention is to improve the productivity by controlling an increase in temperature and pressure in a reactor due to a runaway reaction until the charged monomer is polymerized, which has to a large extent not been attained, heretofore, by an improved batchwise preparation method.

Another object of the present invention is to improve the productivity in the preparation of an industrially useful diene rubber polymer latex.

DISCLOSURE OF THE INVENTION

The present inventors found that the pressure in the reactor can be controlled by controlling the ratio of monomer/water to be charged in an improved batchwise method of preparing a synthetic latex. At the initial stage of the polymerization where an increase in temperature and pressure in the reactor due to the runaway reaction cannot be controlled sufficiently by a conventional improved batchwise preparation method, the pressure in the reactor was controlled within the practical proof pressure, thus completing a method of preparing a synthetic latex of the present invention, which can stably perform the polymerization reaction.

To solve the problems described above, the present invention suggests a method of preparing a synthetic latex, which comprises charging a portion of water and a monomer as raw materials in a reactor, initiating the polymerization, adding dropwise the remainder of said water and said monomer during the polymerization, continuously or intermittently, and performing the emulsion polymerization, wherein: said monomer and said water are charged in said reactor in a ratio of monomer/water, at which a maximum ultimate pressure in said reactor that is attained if an initial composition in said reactor before the initiation of the polymerization is polymerized from a polymerization initiation temperature in an insulated state, is within a practical proof pressure of said reactor.

This method exerts a large effect on the high pressure emulsion polymerization wherein the reaction pressure during the polymerization is 0.098 MpaG or higher.

If the monomer contains a diene monomer, the method can be applied to preparation of an industrially useful diene rubber polymer latex.

The maximum ultimate pressure can be determined by simulated calculation using the relationship between the conversion ratio and the pressure in the reactor and the relationship between the conversion ratio and the polymerization rate, which are obtained from the test results of a batchwise preparation method in which the polymerization temperature after heating is constant.

As used herein, the term "initial composition" refers to a composition which is present in a reactor before the charged monomer initiates the polymerization, and is not limited to those to be charged before heating and also includes those to be added during the heating.

BRIEF DESCRIPTION OF THE INVENTION

BEST MODE FOR CARRYING OUT THE INVENTION

Figure 1:
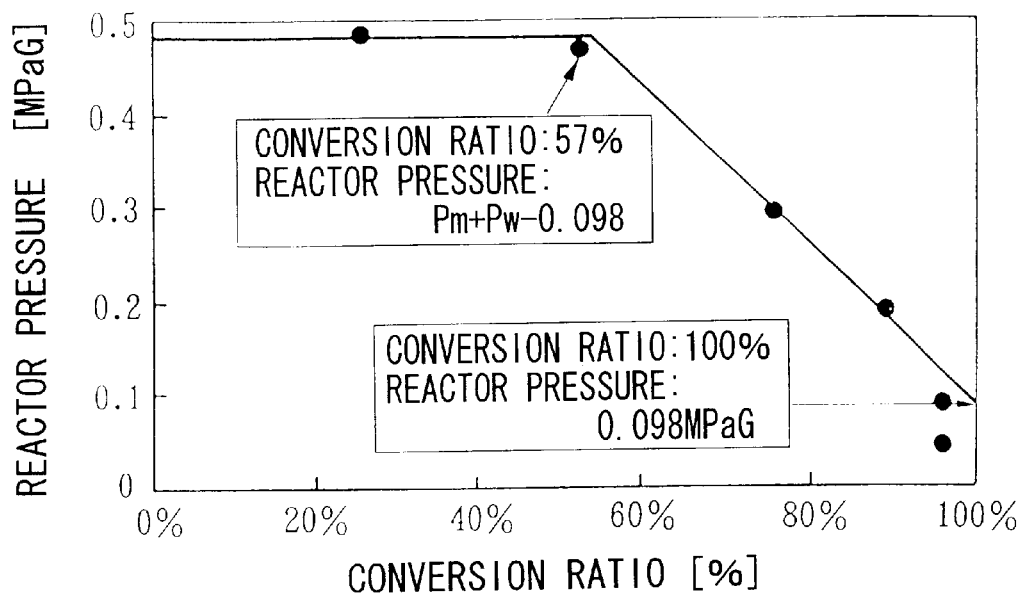
FIG. 1 is a graph showing the relationship between the conversion ratio and the pressure in a reactor during the polymerization of a test of a batchwise preparation method using the same raw materials as those in Example 1.

The present invention will be described in detail below.

For the sake of convenience, the process from the initiation of the polymerization of the charged monomer to the initiation of the dropwise addition of the remainder of the monomer is sometimes referred to as an initial polymerization process, and the process of allowing the polymerization to proceed while adding dropwise the remainder of the monomer continuously or intermittently is sometimes referred to as a final polymerization process. The term "dropwise addition of the water and monomer intermittently" refers to an operation of repeating the dropwise addition of the water and monomer for a predetermined time and their subsequent dropwise addition after a lapse of a predetermined time. The conditions for dropwise addition of the water and monomer are appropriately controlled according to the composition of the raw materials and the temperature control conditions of the final polymerization process.

In the present invention, a monomer, water, an emulsifier, a polymerization initiator and a catalyst are mainly used. In addition, additives such as a crosslinking agent and chain transfer agent etc. can be used. Their composition is appropriately controlled according to the desired synthetic latex.

In the present invention, the term "synthetic latex" means a polymer latex and is not specifically limited, but is preferably a diene rubber polymer latex.

According to the present invention, the operation of a safety valve or a bursting plate can be inhibited by controlling the pressure in the reactor within the practical proof pressure for not only the diene rubber polymer latex, but also any emulsion polymerization.

The present invention is particularly effective when the saturated vapor pressure of the monomer is high, and exerts a large effect on the high pressure emulsion polymerization wherein the reaction pressure during the polymerization is 0.098 MpaG or higher.

The present invention exerts a strong effect on emulsion polymerization using monomers such as diene monomer and vinyl chloride monomer etc. In the emulsion polymerization of the diene rubber, since the saturated vapor pressure of the monomer is high and the pressure in the reactor is not lowered unless the conversion ratio in the reactor reaches about 60%, a very large effect can be expected from the application of the present invention.

A preferable diene rubber polymer latex in the present invention is a latex of a polymer which contains, as a principle component, a diene monomer component such as butadiene or isoprene etc. in an amount within a range from 50 to 100 parts by weight based on 100 parts by weight of the polymer.

Examples of the monomer other than the diene monomer include ethylene series unsaturated monomer. Examples of the ethylene series unsaturated monomer include aromatic vinyl compounds such as styrene or α-methylstyrene etc.; acrylic esters such as methyl acrylate or n-butyl methylstyrene etc.; methacrylic esters such as methyl methacrylate or ethyl methacrylate etc.; and acrylonitrile or methacrylonitrile etc.

Crosslinking agents such as divinylbenzene, 1,3-butylene methacrylate, and allyl methacrylate etc.; and chain transfer agents such as mercaptan series and terpene series etc. can also be used in combination.

The emulsifier is not specifically limited, but alkali metal salts of higher fatty acids such as disproportionated rosin acid, oleic acid and stearic acid etc.; and alkali metal salts of sulfonic acids such as dodecylbenzenesulfonic acid etc. can be used independently or in combination.

The polymerization initiator is not specifically limited, but water-soluble persulfates such as potassium persulfate, sodium persulfate, and ammonium persulfate etc. can be used. Alternatively, there can be used redox series initiators etc. containing an organic peroxide as a component, for example, diisopropylbenzene hydroperoxide, p-menthane hydroperoxide, cumene hydroperoxide, t-butyl hydroperoxide, methylcyclo hydroperoxide, 1,1,3,3-tetramethylbutyl hydroperoxide, 1,1,3,3-tetramethylbutylperoxy-2-ethyl hexanoate, 1,1,3,3-tetramethylbutylperoxy-2-ethyl hexanoate, and t-butylperoxy-3,5,5-tri-methyl hexanoate etc.

Examples of the catalyst include, but are not limited to, ferrous sulfate, sodium formaldehyde sulfoxylate, dextrose, sodium pyrophosphate, and ethylenediaminetetraacetic acid etc. About two or three kinds of these catalysts can sometimes be used in combination.

In the emulsion polymerization, when the polymerization of the monomer of the initial composition proceeds from the polymerization initiation temperature in an insulated state, the pressure in the reactor changes with the progress of the polymerization.

The insulated state refers to a state in which heat transfer from the outside, such as cooling and heating etc., is prevented. That is, the term "the polymerization proceeds from the polymerization initiation temperature in an insulated state" means a state wherein, the time at which the polymerization is initiated by the addition of a catalyst during the heating is defined as the initiation of the polymerization, and then the polymerization proceeds while completely preventing heat transfer from the outside.

In the present invention, the pressure, at which the runaway reaction occurs and the pressure in the reactor exhibits a maximum value, is defined as a maximum ultimate pressure.

When the maximum ultimate pressure is within the practical proof pressure of the reactor, the pressure in the reactor can be controlled to within the practical proof pressure in the initial polymerization process. This makes it possible to prevent the reaction product in the reactor from discharging out of the system as a result of the operation of the safety valve or bursting plate.

The maximum ultimate pressure is strongly effected by the ratio of monomer/water to be charged (the initial composition). That is, the higher the proportion of the monomer in the initial composition, the higher the maximum ultimate pressure.

Accordingly, the pressure in the reactor can be controlled to within the practical proof pressure in the initial polymerization process by controlling the ratio of monomer/water of the initial composition. The final polymerization process can also be promoted by adding dropwise the monomer and water while controlling the polymerization temperature. A method of charging the total amount of water first is also effective to control the ratio of monomer/water.

As a result, according to the present invention, the emulsion polymerization can be stably performed by maintaining the pressure in the reactor within the practical proof pressure in all the processes of the improved batchwise preparation method.

It should be noted in passing that the maximum ultimate pressure not only contributes to pressure control in the reactor currently used, but also serves as a design index for a newly provided reactor.

That is, when the maximum ultimate pressure is determined to the objective polymerization formulation and a reactor having a practical proof pressure higher than the maximum ultimate pressure is designed, the pressure in the reactor during the reaction can be controlled within the practical proof pressure as a matter of course. Accordingly, excess equipment investment can be avoided by designing at an irreducible minimum pressure.

To estimate the maximum ultimate pressure, there can be suggested a test using an autoclave etc. having a sufficient proof pressure or simulation. The test is preferred if the polymerization test in an insulated state can be carried out with sufficient accuracy. Simulation is effective if no test equipment is available.

Using the same raw materials as those in the improved batchwise preparation method, a test of the batchwise preparation method, wherein the polymerization temperature after heating is substantially constant, is performed, and simulation is performed on the assumption that the test results correspond to the initial polymerization process of the improved batchwise preparation method.

The method of estimating the maximum ultimate pressure by means of simulation will be described below concretely by way of a preparation of a diene rubber polymer latex.

1. Simulation Technique of Runaway Reaction of Initial Composition of Improved Batchwise Preparation Method (Estimation of Maximum Ultimate Pressure)

1.1. Test of Batchwise Preparation Method

Using the same raw materials as those in the improved batchwise preparation method for determining the maximum ultimate pressure, the polymerization temperature after heating is set to the same polymerization temperature as that of the improved batchwise preparation method and the test of the batchwise preparation method, wherein this polymerization temperature is substantially constant, is performed.

Figure 2:
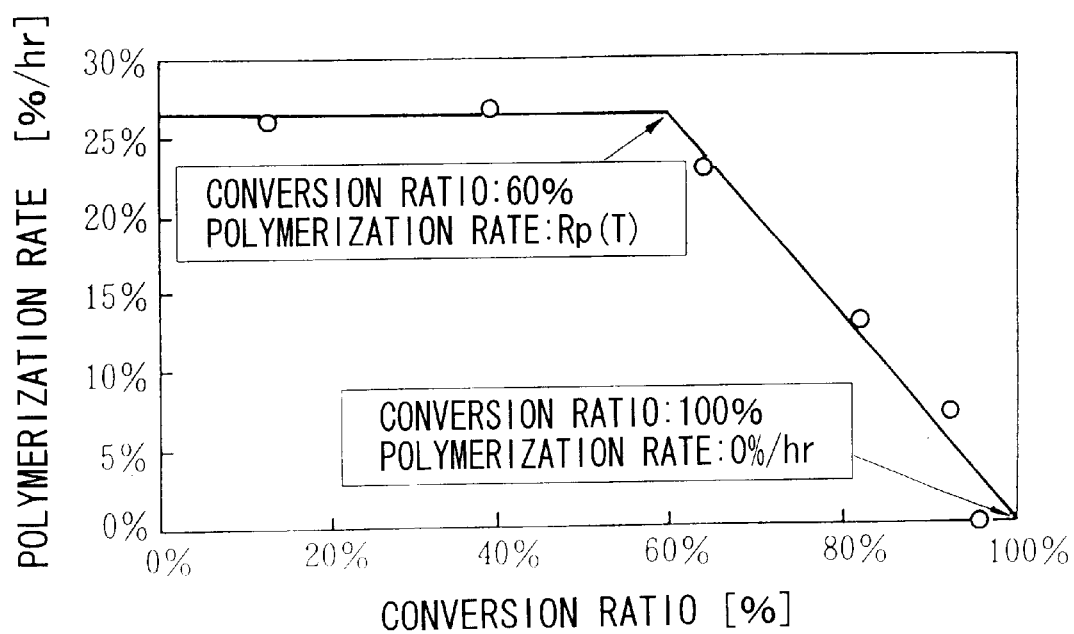
FIG. 2 is a graph showing the relationship between the conversion ratio and the polymerization rate during the polymerization of a test of a batchwise preparation method using the same raw materials as those in Example 1.

An example of the resulting relationship between the conversion ratio and the pressure in the reactor during the polymerization is shown in FIG. 1, and an example of the resulting relationship between the conversion ratio and the polymerization rate is shown in FIG. 2.

In the preparation of the diene rubber polymer by using the batchwise preparation method, the pressure in the reactor and the polymerization rate do not depend on the conversion ratio and are constant and exhibit a value corresponding to the polymerization temperature at the initial stage of the polymerization where a large amount of the monomer exists. Hereinafter, the stage at which the polymerization rate is constant refers to an interval at a constant rate. At the final stage of the polymerization where the amount of the monomer becomes smaller, both the pressure in the reactor and the polymerization rate are lowered with the increase of the conversion ratio.

The graphs of FIG. 1 and FIG. 2 show that a constant polymerization rate is maintained at a constant pressure in the reactor up to the conversion ratio of about 60% and both the pressure in the reactor and the polymerization rate are lowered at the higher conversion ratio.

1.2. Formularization of Relationship Between Conversion Ratio and Pressure in Reactor and Polymerization Rate In the improved batchwise preparation method with the same raw material composition as that in the test of the batchwise preparation method of Section 1.1, it is assumed that the same phenomenon as in Section 1.1 in the runaway reaction of the initial polymerization process. On the basis of the test data of Section 1.1., the pressure in the rector and the polymerization rate during the runaway reaction in the initial polymerization process can be formularized.

Assuming that the relationship shown in FIG. 1 can also be applied to the runaway reaction of the above initial polymerization process, the pressure in the reactor is represented by the following equation.

$$P = f(T, C) \qquad \text{Equation (1)}$$

where

P: pressure in reactor during runaway reaction [MpaG]

T: temperature in reactor during runaway reaction [° C.]

C: conversion ratio in reactor during runaway reaction [%]

For C<57%

$$P = Pm + Pw - 0.098$$

where

Pm: saturated vapor pressure of monomer at temperature T (absolute pressure) [MpaG]

Pw: saturated vapor pressure of water at temperature T [MpaG]

For C>57%

$$P = (Pm + Pw - 0.196)/(57\% - 100\%) \times (C - 57\%) + Pm + Pw - 0.098$$

For C=57%, the equation becomes $P = Pm + Pw - 0.098$, while

For C=100%, the equation becomes $P = 0.098$ MPa.

The saturated vapor pressure (Pm) of the monomer and the saturated vapor pressure of water (Pw) of the equation (1) are represented by the following equations, respectively.

$$Pm = 0.0067 \times 10^{(4.50 - 620/(183+T))}$$

$$Pw = 0.0069 \times 10^{(6.23 - 1653/(227+T))}$$

Assuming that the relationship shown in FIG. 2 can also be applied to the runaway reaction of the initial composition of the improved batchwise preparation method, the polymerization rate is represented by the following equation (2).

$$Rp = f(T, C) \qquad \text{Equation (2)}$$

where

Rp: polymerization rate during runaway reaction in initial composition of improved batchwise preparation method [%/hr]

For C≦60%

Rp=Rp(T)

Rp(T): polymerization rate within interval at constant rate in initial composition of improved batchwise preparation method [%/hr]

For C>60%

$$Rp = Rp(T)/(60\% - 100\%) \times (C - 60\%) + Rp(T)$$

In the equation (2), the polymerization rate Rp(T) within an interval at a constant rate of a temperature T in the initial polymerization process of the improved batchwise preparation method is unclear.

Therefore, a test is performed by the same batchwise preparation method carried out in Section 1.1., except for changing the polymerization temperature. Based on the test results, the polymerization rate Rp(T) is estimated.

Figure 3:
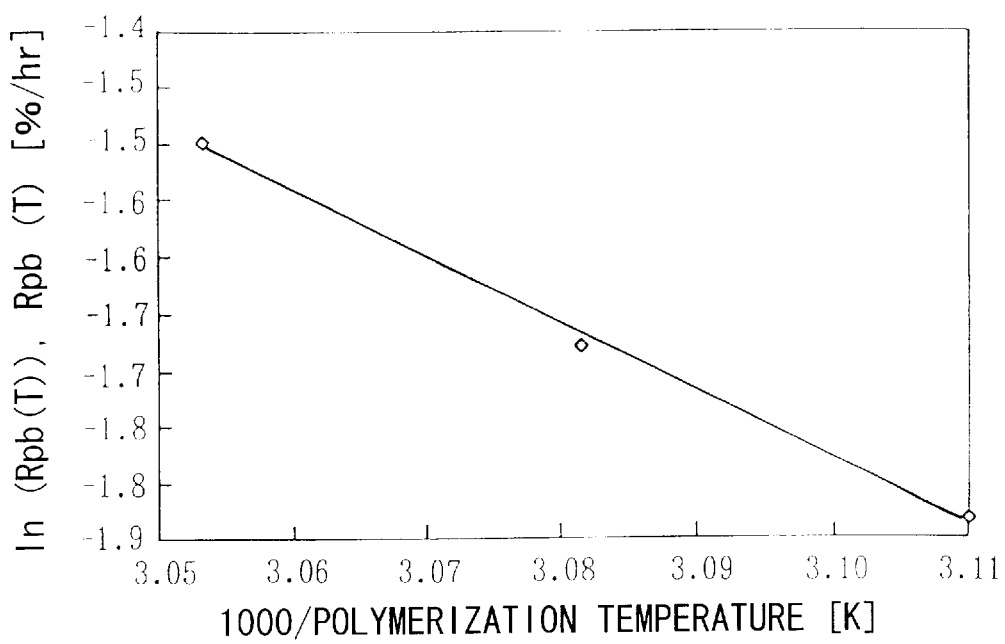
FIG. 3 is a graph showing the results of a test of a batchwise preparation method using the same raw materials as those in Example 1, as the relationship between the polymerization rate and the polymerization temperature within an interval at a constant rate in the batchwise preparation.

FIG. 3 is a graph wherein an example of the test results is shown by the relationship between the polymerization rate Rpb(T) and the polymerization temperature within an interval at a constant rate in the batchwise preparation. In this graph, the ordinate represents in (Rpb(T)) and the abscissa represents 1000/polymerization temperature so as to easily make reference to the Arrhenius equation. The units of the polymerization temperature are K [Kelvin].

From this graph, the relationship between the polymerization rate Rpb(T) and the polymerization temperature (temperature in reactor) T [° C.] is represented by the following equation (3).

$$Rpb(T)=1.269 \cdot 10^7 \exp(-5849/(273+T))$$  Equation (3)

Rpb(T): polymerization rate within interval at constant rate in batchwise preparation method [%/hr]

However, the charge composition of the test of the batchwise preparation method and that of the initial composition of the improved batchwise preparation method are different in components to be added dropwise. Specifically, they are different in the concentration of emulsifiers and initiators etc.

Accordingly, the polymerization rate Rp(T) during the runaway reaction of the initial composition of the equation (2) and the polymerization rate Rpb(T) given by the equation (3) are different even if the polymerization temperatures are the same.

Therefore, the equation (3) cannot be applied actually to the runaway reaction of the initial composition as it is.

On the assumption that the Smith-Ewart theory is valid for the polymerization rate in the runaway reaction of the initial composition, a change of the polymerization rate due to the change of the polymerization composition is corrected based on the equation (3).

Assuming that the Smith-Ewart theory is valid for the polymerization rate, the polymerization rate in the runaway reaction of the initial composition is proportional to the three fifths power of the concentration of the emulsifier, and is proportional to the two fifths powder of the concentration of the concentration of the initiator.

Accordingly, the polymerization rate Rp(T) shown in the equation (2) is obtained from the polymerization rate Rpb(T) given by the equation (3) by the following equation.

$$Rp(T)=Rpb(T) \times (NC2/NC1)^{3/5} \times (SC2/SC1)^{2/5}$$  Equation (4)

where

NC1: concentration of emulsifier in test of batchwise preparation method [% by weight]

NC2: concentration of emulsifier of initial composition [% by weight]

SC1: concentration of initiator in test of batchwise preparation method [% by weight]

SC2: concentration of initiator of initial composition [% by weight]

The concentration of the emulsifier and that of the initiator in the equation (4) were represented by % by weight based on the weight of water on the assumption that the emulsifier and initiator dissolve only in an aqueous phase.

1.3. Simulation Technique of Runaway Reaction of Initial Composition

In an improved batchwise preparation method, the following heat balance stands up for temperature changes when an initial composition is polymerized from a polymerization initiation temperature in an insulated state.

$$Cp \times dT = Hp \times Rp \times M \times dt$$  Equation (5)

where

Cp: specific heat of initial composition [J/kg]

T: temperature in reactor [° C.]

Hp: heat generated during the polymerization of monomer [J/kg]

M: weight of monomer of initial composition [kg]

t: polymerization time [hr]

Furthermore, the conversion ratio C is obtained by integrating the polymerization rate Rp with respect to the time t as shown in the following equation (6).

$$C = \int Rp \, dt$$  Equation (6)

The above equation (5) can be solved by carrying out successive calculations using the above equations (2), (3), (4) and (6).

As a result, it becomes possible to calculate a change of the temperature T in a polymerization reactor and the conversion ratio C with a proceeding of the polymerization time t.

Utilizing these results, a change of the pressure in the reactor with a proceeding of the polymerization time t can be calculated by the formula (1). Thus, a maximum ultimate pressure can be estimated from the change of the pressure.

EXAMPLES

The following Examples further illustrate the present invention in detail.

The symbols used in the Examples represent the following compounds.

BD: 1,3-butadiene (monomer)

ST: styrene (monomer)

DV: divinylbenzene (crosslinking agent)

GK: beef fatty acid potassium (emulsifier)

FK: disproportionated rosin acid potassium (emulsifier)

DR: dextrose (catalyst)

RF: ferrous sulfate

PS: Sodium pyrophosphate (catalyst)

BP: diisopropylbenzene hydroperoxide (polymerization initiator)

PM: paramenthane hydroperoxide (polymerization initiator)

DW: deionized water

As the polymerization reactor used in the Examples, a reactor having a proof pressure of 3 MP was used taking safety of the test into account. In any of the Examples (Comparative Examples), the safety valve operation pressure (practical proof pressure) was 0.88 MP, based on the assumption of the reactor having a proof pressure of 1 MP.

The runaway reaction was realized by carrying out the polymerization in an insulated state on the assumption of a system wherein it became impossible to remove heat due to a problem with the jacket or condenser.

Example 1

According to the above simulation, a maximum ultimate pressure in an improved batchwise preparation method was determined based on the test results of a batchwise preparation method. The reactor was a 70 L SUS reactor equipped with a safety valve (operation pressure: 0.88 MP). The ratio of monomer/water to be charged, at which the estimated maximum ultimate pressure is lower than the operation pressure of the safety valve, that is, within the practical proof pressure of the reactor, was determined and the following test procedure was assumed.

First, the following was charged into the reactor.

BD: 2.34 kg (20% by weight based on the total amount)

ST: 0.66 kg (20% by weight based on the total amount)

DW: 13.95 kg (50% by weight based on the total amount)

GK: 110 g

FK: 110 g

DR: 30 g

BP: 20 g

After heating, the following catalysts were added during the heating (43° C.) and the polymerization was initiated.

RF: 0.45 g

PS: 45 g

If the polymerization proceeded normally, the mixture was heated to a polymerization temperature of 58° C. and maintained at the same temperature, and then the remainder of the water and monomer was added dropwise under the following conditions.

BD: dropwise addition was initiated 30 minutes after the initiation of the polymerization, and it was added dropwise in an amount of 80% by weight based on the total amount at a dropping flow rate of 6.24 kg/hr for 90 minutes.

ST: dropwise addition was initiated 30 minutes after the initiation of the polymerization and it was added dropwise in the amount of 80% by weight based on the total amount at a dropping flow rate of 1.76 kg/hr for 90 minutes.

DW: dropwise addition was initiated 30 minutes after the initiation of the polymerization and it was added dropwise in the amount of 50% by weight based on the total amount at a dropping flow rate of 5.58 kg/hr for 150 minutes.

BP: Added dropwise in an amount of 10 g at 150 minutes after the initiation of the polymerization.

Using a reactor equipped with a safety valve (operation pressure: 0.88 MP), the test was performed in an insulated state actually. Immediately after adding RF and PS, the polymerization was initiated to cause a runaway reaction. However, the safety valve did not operate and the pressure in the reactor could be controlled to within the practical proof pressure.

Figure 4:
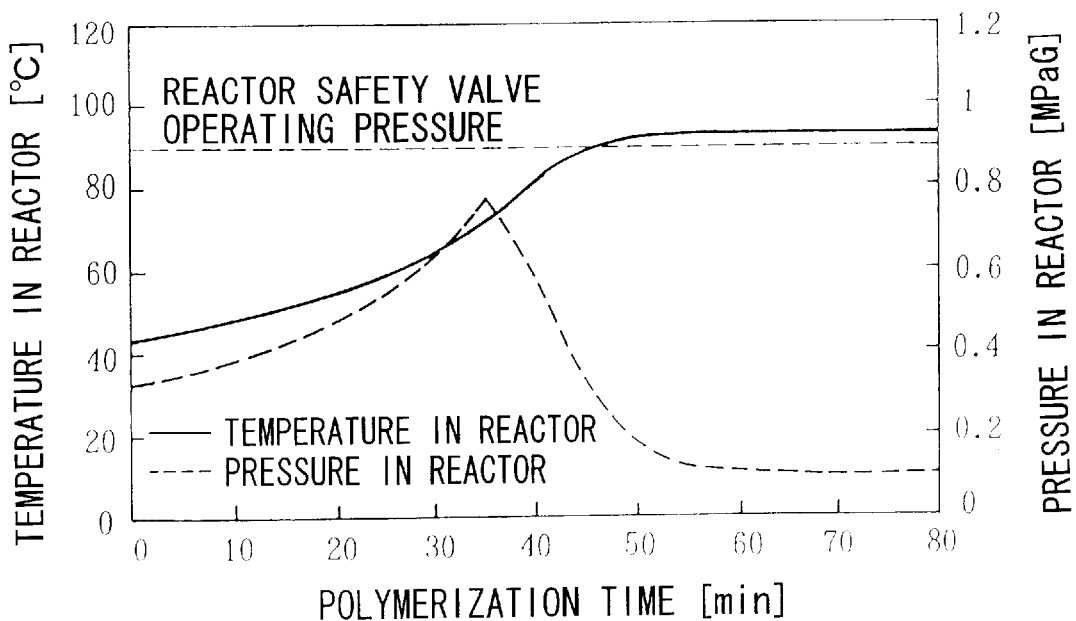
FIG. 4 is a graph showing the results of a temperature/pressure simulation test of the runaway reaction for the initial composition of Example 1.

FIG. 4 is a graph showing the results of a temperature/pressure simulation test of the runaway reaction in an initial composition. In the simulation, the calculation was performed at time intervals of 0.2 minutes. In the simulation, as the relationship between the conversion ratio of the polymerization degree and the pressure in the reactor, the relationship between the conversion ratio and the polymerization degree and the relationship between the polymerization rate and the polymerization temperature within an interval at a constant rate, which are obtained by the batchwise preparation method, those shown in FIG. 1, FIG. 2 and FIG. 3 were used, respectively.

It is apparent that the maximum ultimate pressure is low, such as 0.77 MpaG, compare to the safety valve operation pressure of 0.88 MpaG and the safety valve disposed in the reactor does not operate and the pressure in the reactor can be controlled to within the practical proof pressure even if the pressure in the reactor reaches a maximum pressure, and this was confirmed by the test.

Comparative Example 1

In the same manner as in Example 1, except for charging the water and monomer at a ratio, at which the maximum ultimate pressure is larger than the above safety valve operation pressure, that is, the practical proof pressure of the reactor, the simulation and test were performed. The used test procedure was as follows.

First, the following were charged into the reactor.

BD: 3.9 kg (33% by weight based on the total amount)

ST: 1.1 kg (33% by weight based on the total amount)

DW: 9.3 kg (33% by weight based on the total amount)

GK: 110 g

FK: 110 g

DR: 30 g

BP: 20 g

After heating, the following catalysts were added during the heating (43° C.).

RF: 0.45 g

PS: 45 g

If the polymerization proceeds normally, the mixture was heated to the polymerization temperature of 58° C. and maintained at the same temperature, and then the remainder of the water and monomer was added dropwise under the following conditions.

BD: dropwise addition was initiated 30 minutes after the initiation of the polymerization, and it was added dropwise in the amount of 67% by weight based on the total amount at a dropping flow rate of 5.20 kg/hr for 90 minutes.

ST: dropwise addition was initiated 30 minutes after the initiation of the polymerization, and it was added dropwise in the amount of 67% by weight based on the total amount at a dropping flow rate of 1.467 kg/hr for 90 minutes.

DW: dropwise addition was initiated 30 minutes after the initiation of the polymerization, and it was added dropwise in the amount of 67% by weight based on the total amount at a dropping flow rate of 7.44 kg/hr for 150 minutes.

BP: added dropwise in the amount of 10 g at 150 minutes after the initiation of the polymerization.

Using a reactor equipped with no safety valve, the test was performed in an insulated state actually. Immediately after adding RF and PS, the polymerization was initiated to cause a runaway reaction. The pressure exceeded the estimated safety valve operation pressure (0.88 MP) and, therefore, the test was stopped.

Figure 5:
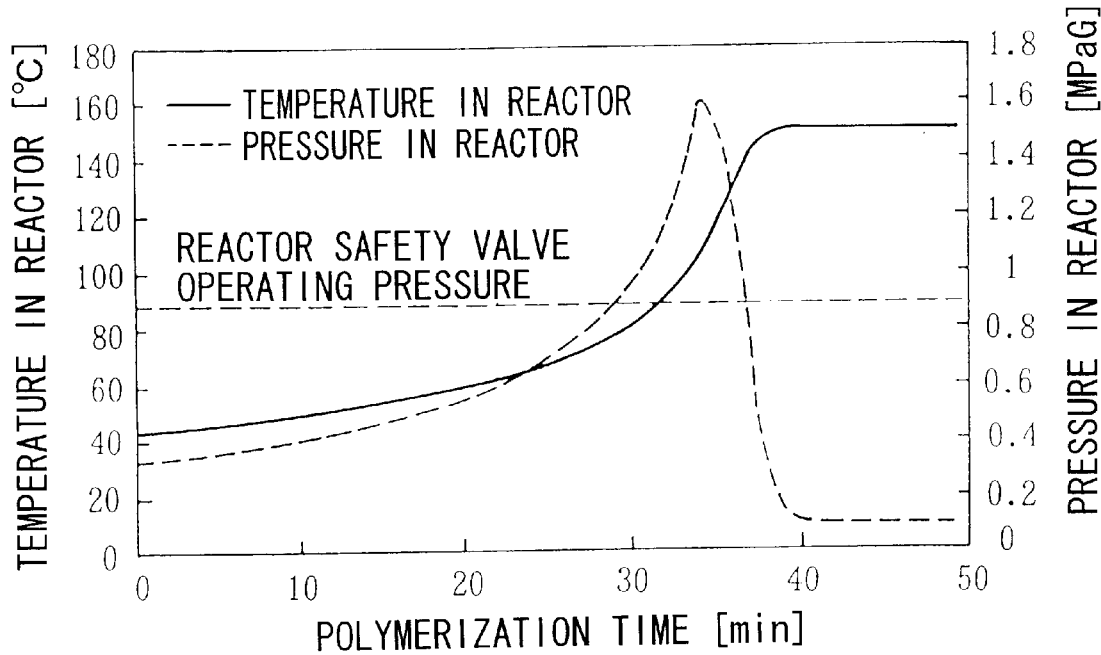
FIG. 5 is a graph showing the results of a temperature/pressure simulation test of the runaway reaction for the initial composition of Comparative Example 1.

FIG. 5 is a graph showing the results of a temperature/pressure simulation test of the runaway reaction in an initial composition of Comparative Example 1. In the simulation, the calculation was performed at time intervals of 0.2 minutes. In the simulation, as the relationship between the conversion ratio of the polymerization degree and the pressure in the reactor, the relationship between the conversion ratio and the polymerization degree and the relationship between the polymerization rate and the polymerization temperature within an interval at a constant rate, which are obtained by the batchwise preparation method, for example, those shown in FIG. 1, FIG. 2 and FIG. 3 were used, respectively.

As is apparent from FIG. 5, the maximum ultimate pressure is high, such as 1.60 MpaG, compared to the safety valve operation pressure of 0.88 MpaG and the safety valve disposed in the reactor operates due to the increase of the pressure in the reactor and, therefore, the contents of the reactor are discharged out of the system, and this could also be confirmed by the simulation.

Comparative Example 2

The test by a batchwise preparation method was carried out under the following conditions and the runaway reaction test and simulation were performed.

First, the following were charged in a 70 L SUS reactor.
BD: 11.7 kg
ST: 3.3 kg
DW: 27.9 kg
GK: 110 g
FK: 110 g
DR: 30 g
BP: 30 g After raising the temperature in the reactor, the following catalysts are added during the heating (43° C.) and the polymerization was initiated.
RF: 0.45 g
PS: 45 g Using a reactor equipped with no safety valve, the test was performed in an insulated state actually. As a result, the runaway reaction occurred and the pressure exceeded the estimated safety valve operation pressure (0.88 MP) and, therefore, the test was stopped.

Figure 6:
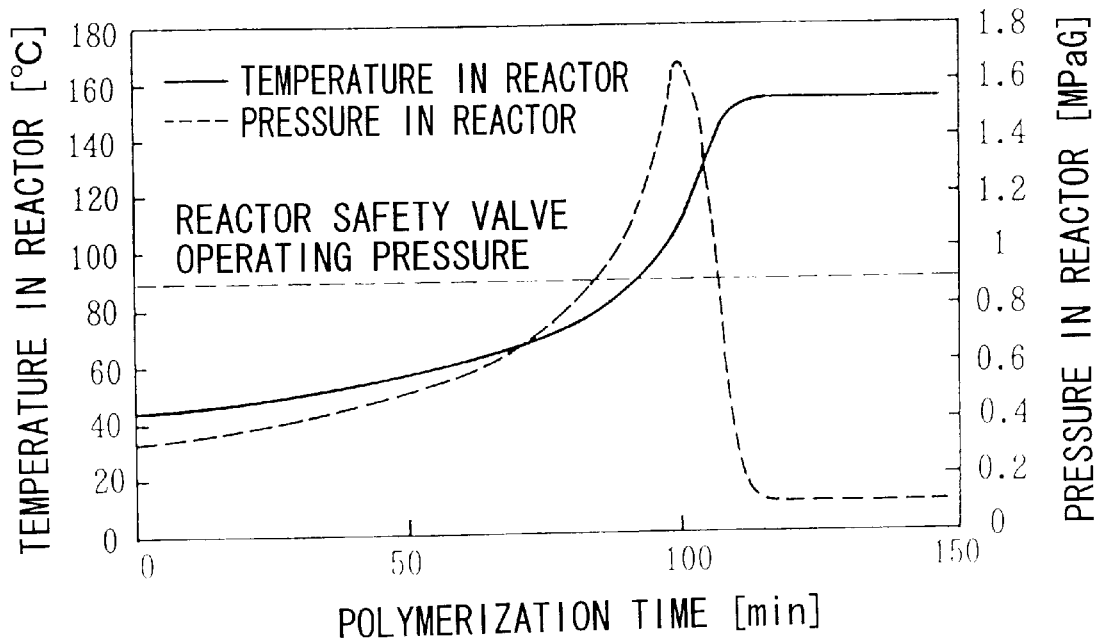
FIG. 6 is a graph showing the results of a temperature/pressure simulation test of the runaway reaction for the initial composition of Comparative Example 2.

FIG. 6 is a graph showing the results of a simulation test of the runaway reaction in Comparative Example 2. In the simulation, the calculation was performed at time intervals of 0.2 minutes. In the simulation, as the relationship between the conversion ratio of the polymerization degree and the pressure in the reactor, the relationship between the conversion ratio and the polymerization degree and the relationship between the polymerization rate and the polymerization temperature within an interval at a constant rate, which are obtained by the batchwise preparation method, those shown in FIG. 1, FIG. 2 and FIG. 3 were used, respectively.

As is apparent from FIG. 6, the maximum ultimate pressure is high, such as 1.66 MpaG, compared to the safety valve operation pressure of 0.88 MpaG and the safety valve disposed in the reactor operates due to the increase of the pressure in the reactor and, therefore, the contents of the reactor are discharged out of the system, and this could also be confirmed by the simulation.

Example 2

The simulation and test were performed in the same manner as in Example 1, except that the test procedure was changed as follows. The used procedure was as follows.

First, the following were charged into the reactor.
BD: 3.3 kg (28% by weight based on the total amount)
ST: 0.9 kg (28% by weight based on the total amount)
DW: 24.9 kg
GK: 25 g
PM: 9 g After heating, the following catalysts are added during the heating (43° C.).
RF: 0.30 g
PS: 42 g
DR: 9 g
DW: 0.7 kg If the polymerization proceeded normally, the mixture was heated to the polymerization temperature of 63° C. and maintained at the same temperature, and then the remainder of the water and monomer was added dropwise under the following conditions.
BD: dropwise addition was initiated 120 minutes after the initiation of the polymerization, and it was added dropwise in the amount of 72% by weight based on the total amount at a dropping flow rate of 3.36 kg/hr for 150 minutes.
ST+DV: dropwise addition was initiated 120 minutes after the initiation of the polymerization and they were added dropwise in the amount of 72% by weight based on the total amount at a dropping flow rate of 1.09 kg/hr for 150 minutes.
GK+DW+DR: After dissolving GK (200 g) and DR (21 g) in DW (2 kg), dropwise addition was initiated 120 minutes after the initiation of the polymerization and they were added dropwise at a dropping flow rate of 0.89 kg/hr for 150 minutes.
PM: added in amounts of 9 g each at 4 hours, 6 hours, 8 hours and 10 hours after the initiation of the polymerization.

Using a reactor equipped with a safety valve (operation pressure: 0.88 MP), the test was performed in an insulated state actually. Immediately after adding RF and PS, the polymerization was initiated to cause a runaway reaction. However, the safety valve did not operate and the pressure in the reactor could be controlled within the practical proof pressure.

Figure 7:
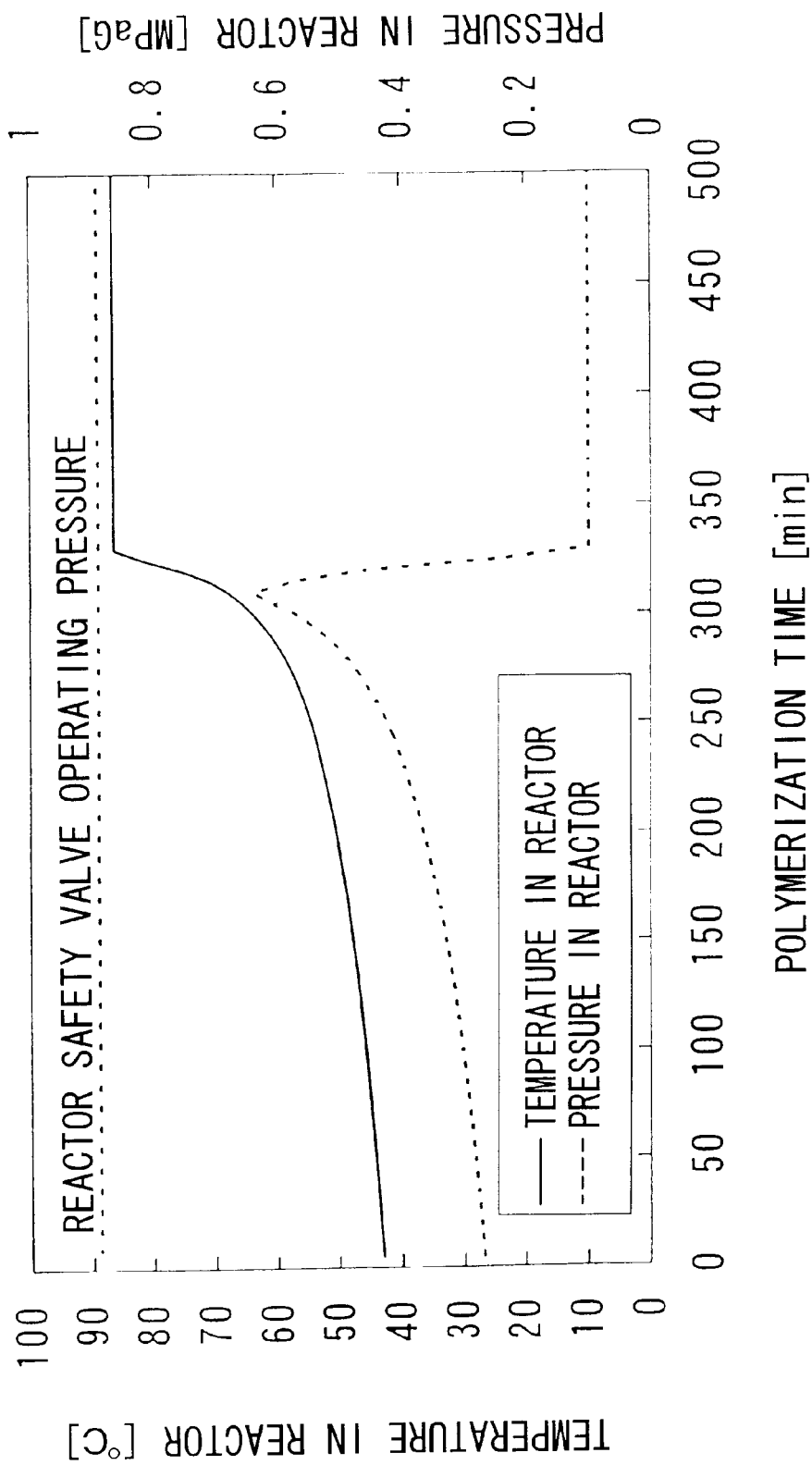
FIG. 7 is a graph showing the results of a temperature/pressure simulation test of the runaway reaction for the initial composition of Example 2.
Figure 8:
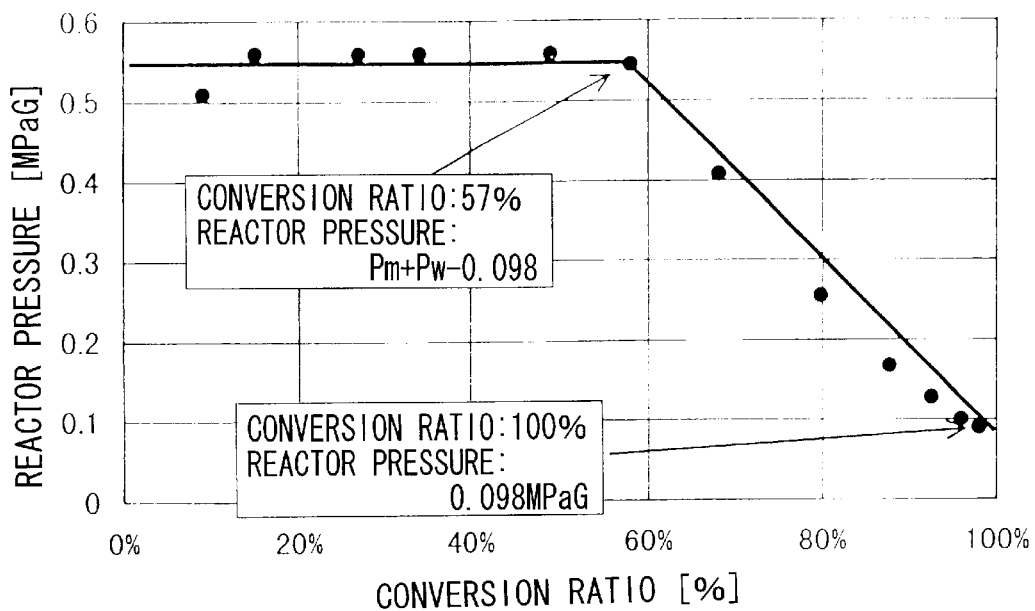
FIG. 8 is a graph showing the relationship between the conversion ratio and the pressure in a reactor during the polymerization of a test of a batchwise preparation method using the same raw materials as those in Example 2.
Figure 9:
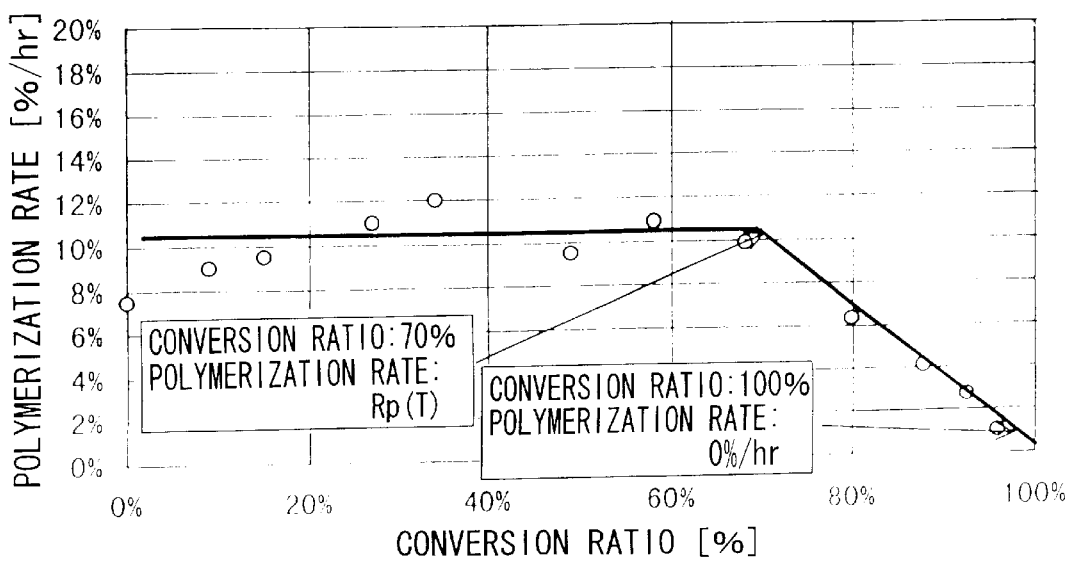
FIG. 9 is a graph showing the relationship between the conversion ratio and the polymerization rate during the polymerization of a test of a batchwise preparation method using the same raw materials as those in Example 2.
Figure 10:
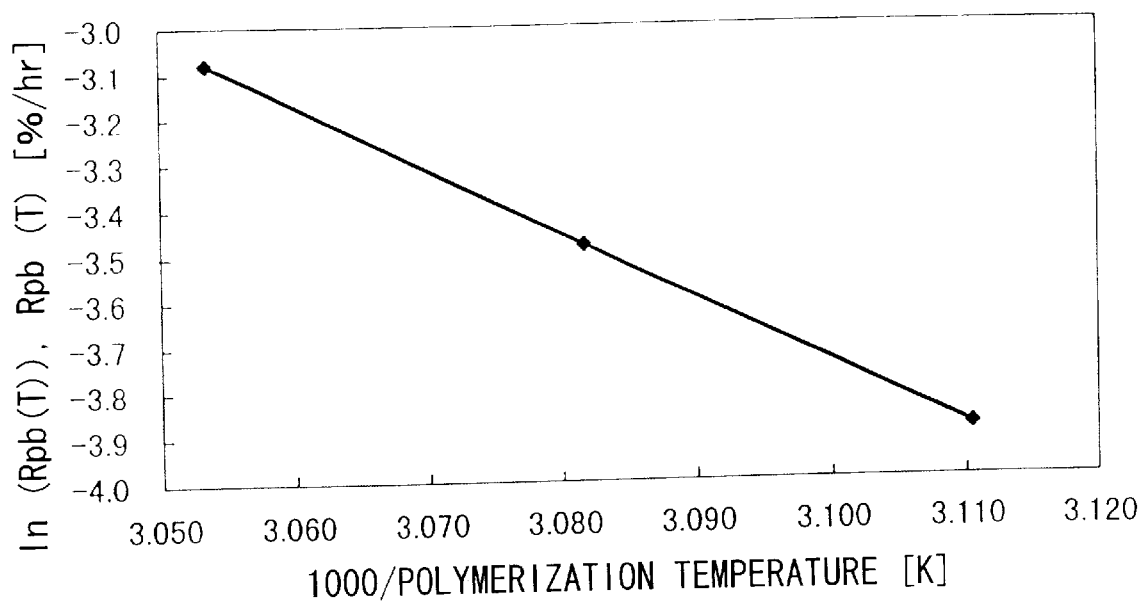
FIG. 10 is a graph showing the results of the test of a batchwise preparation method using the same raw materials as those in Example 2 as the relationship between the polymerization rate and the polymerization temperature within an interval at a cosntant rate in the batchwise preparation.

FIG. 7 is a graph showing the results of a temperature/pressure simulation test of the runaway reaction in an initial composition. In the simulation, the calculation was performed at time intervals of 0.2 minutes. The relationship between the conversion ratio of the polymerization degree and the pressure in the reactor, which is obtained by the batchwise preparation method, was shown in FIG. 8, the relationship between the conversion ratio and the polymerization rate was shown in FIG. 9, and the relationship between the polymerization rate and the polymerization temperature within an interval at a constant rate was shown in FIG. 10, respectively.

It is apparent that the maximum ultimate pressure is low, such as 0.77 MpaG, compared to the safety valve operation pressure of 0.88 MpaG and the safety valve disposed in the reactor does not operate and the pressure in the reactor can be controlled within the practical proof pressure even if the pressure in the reactor reaches a maximum pressure, and this is confirmed by the test.

By the way, as is apparent from FIG. 5 and FIG. 6, the temperature rise during the runaway reaction in the batchwise preparation method arises slowly as compared with the improved batchwise preparation method. Therefore, the time required for the pressure to exceed the safety valve operation pressure after the initiation of the polymerization is 28 minutes in Comparative Example 1 (improved batchwise method), while it is 101 minutes in Comparative Example 2 (batchwise method).

As described above, since the temperature rise rate is small, it is rare for the pressure in the reactor to exceed the practical proof pressure and for the safety valve to operate when the preparation is carried out at present by the batchwise preparation method in an industrial scale. However for a method of preparing any synthetic latex, the pressure in the reactor is preferably controlled to a pressure lower than the practical proof pressure of the reactor, as in the method of the present invention, as a matter of course.

In the results of all the simulations of the Examples and the Comparative Examples, a rapid pressure drop occurred after the pressure reached the maximum pressure. Accordingly, it seems as if the pressure in the reactor can be controlled by the pressure drop.

However, the pressure drop is caused by the simulation when there is a sufficient amount of a polymerization initiator in the system. That is, when the temperature in the polymerization system increases, the initiator is rapidly consumed. When the initiator is completely consumed, the polymerization is sometimes terminated to maintain a high pressure. In this case, the above pressure drop cannot be expected.

In the present invention, the pressure in the reactor can be maintained within the practical proof pressure even in this case, so that the operation of the safety valve or bursting plate disposed in the reactor can be prevented.

INDUSTRIAL APPLICABILITY

As described above, according to the present invention, the pressure in a reactor in an initial polymerization process can be controlled within the practical proof pressure by charging a monomer and water in the reactor in a ratio of monomer/water, at which the maximum ultimate pressure in the reactor is within the practical proof pressure of the reactor. Thus, it makes possible to prevent the reaction product in the reactor from discharging out of the system by operating a safety valve or a bursting plate.

As a result, it is made possible to stably conduct the emulsion polymerization and to improve the productivity by controlling the temperature and pressure in the reactor in a runaway reaction in all the processes of the method of preparing the synthetic latex.

What is claimed is:

1. A method for preparing a synthetic latex, comprising:
   charging a portion of water and a monomer as raw materials in a reactor;
   initiating emulsion polymerization;
   adding dropwise a remainder of said water and said monomer during said emulsion polymerization, continuously or intermittently; and
   continuing said emulsion polymerization;
   wherein said monomer and said water are charged in said reactor in a ratio of monomer/water at which a maximum ultimate pressure in said reactor is within a practical proof pressure of said reactor;
   wherein said maximum ultimate pressure in said reactor is attained while an initial composition in said reactor before said initiating of said emulsion polymerization is polymerized at a polymerization initiation temperature in an insulated state.

2. The method according to claim 1, wherein a reaction pressure during said emulsion polymerization is 0.098 MpaG or higher.

3. The method according to claim 1, wherein said monomer comprises a diene monomer.

4. The method according to claim 1, wherein said maximum ultimate pressure is determined by a simulated calculation using a relationship between a conversion ratio and a pressure in said reactor and a relationship between said conversion ratio and a polymerization rate, which are obtained from test results of a batchwise preparation method in which the polymerization temperature after heating is constant.

5. The method according to claim 1, further comprising:
   charging in said reactor at least one member selected from the group consisting of an emulsifier, a polymerization initiator, a catalyst, a crosslinking agent and a chain transfer agent.

6. The method according to claim 1, wherein said synthetic latex is a diene rubber polymer latex.

7. The method according to claim 1, wherein an operation of a safety valve or a bursting plate is inhibited.

8. The method according to claim 1, wherein a pressure in said reactor is not lowered unless a conversion ratio in said reactor reaches about 60%.

9. The method according to claim 3, wherein an amount of said diene monomer is from 50 to 100 parts by weight based on 100 parts by weight of a polymer in said synthetic latex.

10. The method according to claim 3, wherein said diene monomer is butadiene or isoprene.

11. The method according to claim 3, wherein said monomer further comprises an ethylenically unsaturated monomer.

12. The method according to claim 11, wherein said ethylenically unsaturated monomer is selected from the group consisting of aromatic vinyl compounds, acrylic esters, methacrylic esters, acrylonitrile and methacrylonitrile.

13. The method according to claim 5, wherein said crosslinking agent is selected from the group consisting of divinylbenzene, 1,3-butylene methacrylate and allyl methacrylate.

14. The method according to claim 5, wherein said chain transfer agent is selected from the group consisting of a mercaptan compound, a terpene compound and mixtures thereof.

15. The method according to claim 5, wherein said emulsifier is selected from the group consisting of alkali metal salts of higher fatty acids, alkali metal salts of sulfonic acids and a mixture thereof.

16. The method according to claim 5, wherein said polymerization initiator is selected from the group consisting of water-soluble persulfates.

17. The method according to claim 5, wherein said polymerization initiator is selected from the group consisting of redox initiators containing an organic peroxide.

18. The method according to claim 5, wherein said catalyst is selected from the group consisting of ferrous sulfate, sodium formaldehyde sulfoxylate, dextrose, sodium pyrophosphate, ethylenediaminetetraacetic acid and mixtures thereof.

19. The method according to claim 1, wherein said maximum ultimate pressure increases with a proportion of said monomer in said initial composition.

20. The method according to claim 1, which is performed batchwise.

* * * * *